US008564911B2

(12) United States Patent
Koike et al.

(10) Patent No.: US 8,564,911 B2
(45) Date of Patent: Oct. 22, 2013

(54) MAGNETO-RESISTIVE EFFECT ELEMENT HAVING SPACER LAYER INCLUDING GALLIUM OXIDE LAYER WITH METAL ELEMENT

(75) Inventors: Hayato Koike, Tokyo (JP); Tsutomu Chou, Tokyo (JP); Yoshihiro Tsuchiya, Tokyo (JP); Hironobu Matsuzawa, Tokyo (JP)

(73) Assignee: TDK Corporation, Tokyo (JP)

( * ) Notice: Subject to any disclaimer, the term of this patent is extended or adjusted under 35 U.S.C. 154(b) by 163 days.

(21) Appl. No.: 13/029,415

(22) Filed: Feb. 17, 2011

(65) Prior Publication Data

US 2012/0212860 A1 Aug. 23, 2012

(51) Int. Cl.
*G11B 5/39* (2006.01)
(52) U.S. Cl.
USPC ........................................ 360/324.2
(58) Field of Classification Search
USPC ............... 360/324.2, 324.1; 257/421–427; 324/244–263; 365/145, 158, 171–173; 428/810–816
See application file for complete search history.

(56) References Cited

U.S. PATENT DOCUMENTS

| 6,347,049 B1 * | 2/2002 | Childress et al. ............. 365/173 |
| 6,359,289 B1 * | 3/2002 | Parkin ............................. 257/43 |
| 7,672,085 B2 | 3/2010 | Hara et al. |
| 8,405,935 B2 * | 3/2013 | Chou et al. ................. 360/324.1 |
| 8,432,645 B2 * | 4/2013 | Matsuzawa et al. ....... 360/324.1 |
| 8,441,763 B2 * | 5/2013 | Chou et al. ................. 360/324.1 |
| 2008/0117554 A1 | 5/2008 | Hara et al. |
| 2008/0170336 A1 | 7/2008 | Tsuchiya et al. |
| 2010/0039734 A1 | 2/2010 | Hara et al. |

FOREIGN PATENT DOCUMENTS

| JP | 2002-319722 | 10/2002 |
| JP | A-2003-086863 | 3/2003 |
| JP | 2010-044848 | 2/2010 |

OTHER PUBLICATIONS

Partial English translation, JP2010-044848, Hara et al, Thin-Film Magnetic Head, pp. 1-15.*
Office Action mailed on Feb. 5, 2013 issued from the Japan Patent Office in the corresponding Japanese patent application No. 2011-279597 (English translation attached).
Office Action mailed Mar. 19, 2013 in corresponding JP Application No. 2011-279597 (English translation only).

* cited by examiner

*Primary Examiner* — Brian Miller
(74) *Attorney, Agent, or Firm* — Posz Law Group, PLC

(57) ABSTRACT

A magneto-resistive effect (MR) element includes: first and second magnetic layers in which a relative angle formed by magnetization directions changes according to an external magnetic field; and a spacer layer positioned between the first magnetic layer and the second magnetic layer. The spacer layer includes a main spacer layer composed of gallium oxide as a primary component and containing at least one metal element selected from a group of magnesium, zinc, indium and aluminum.

8 Claims, 7 Drawing Sheets

⊗ Magnetization Direction: from front side to back side of the sheet
⊙ Magnetization Direction: from back side to front side of the sheet

MAGNETO-RESISTIVE EFFECT ELEMENT HAVING SPACER LAYER INCLUDING GALLIUM OXIDE LAYER WITH METAL ELEMENT

BACKGROUND OF THE INVENTION

1. Field of the Invention

The present invention relates to a magneto-resistive effect (MR) element and particularly to a configuration of a spacer layer.

2. Description of the Related Art

Reproducing heads with high sensitivity and high output are in demand in conjunction with condensing of high recording density in hard disk drives (HDD). As an example of this type of reproducing head, a spin valve head has been developed. A spin valve head includes a nonmagnetic metal layer and a pair of ferromagnetic layers positioned on both sides of the nonmagnetic metal layer in a manner of contacting the nonmagnetic metal layer. The magnetization direction of one side of the ferromagnetic layers is pinned in one direction (hereinafter, this type of layer is referred to as a magnetization pinned layer), and the magnetization direction of the other side of the ferromagnetic layers freely rotates in response to an external magnetic field (hereinafter, this type of layer is referred to as a magnetization free layer). When an external magnetic field is applied, the relative angle of spins between the magnetization pinned layer and the magnetization free layer changes so that magneto-resistive change is realized. Typically, the magnetization direction of the magnetization pinned layer is pinned by utilizing exchange coupling force of an anti-ferromagnetic layer. In the present specification, a stack in which the above-described pair of ferromagnetic layers and a spacer layer are laminated is referred to as a magneto-resistive effect element (MR element).

On the other hand, in order to realize further condensing of high recording density, a reduction of a read gap (a space between upper and lower shield layers or a height of the MR element in a lamination direction) is required. However, when the read gap is reduced to approximately 20 nm, placing an anti-ferromagnetic layer within the read gap becomes difficult. Therefore, a configuration has been developed in which a pair of magnetization free layers is arranged on both sides of the spacer layer. Since no anti-ferromagnetic layer is needed with this configuration, it becomes easy to realize reduction of the read gap.

In any configuration, in order to realize high recording density, it is required to reduce not only the read gap but also a plane area of the MR element, i.e., a cross sectional area of the MR element on a cross section parallel to film surfaces of layers configuring the MR element. For example, in order to realize recording density of 1 Tbits/in$^2$, it is desirable to reduce an element size to 25 nm×25 nm or less. Especially, the size reduction of the MR element in the track width direction causes a track pitch of a recording medium to be reduced. However, as the cross sectional area of the MR element is reduced, a resistance of the MR element is increased. When the resistance of the MR element is increased, the deterioration in the high-frequency response characteristic of the MR element and the increase in noise occur, and in turn signal to noise ratio (S/N ratio) is deteriorated. Therefore, it is important to suppress the increase in the resistance of the MR element when an element size is reduced. To achieve this, it is important to reduce a resistance-area (RA) of the MR element; and it is desirable that the RA is 0.3 $\Omega\mu m^2$ or less in order to achieve the recording density over 1 Tbits/in$^2$.

Accordingly, a new configuration of a spacer layer has been discussed which allows to realize a small RA and a large magnetoresistance ratio (hereafter, referred to as the MR ratio). The U.S. Patent Application Publication No. 2008/0170336 discloses a spacer layer having a three layer configuration in which Cu layers are arranged on both sides of a ZnO layer, and a metal such as Au, Ag or the like that is less likely to be oxidized than Zn is added to the ZnO layer. By adding the metal to the ZnO layer, the large MR ratio can be obtained while the RA is maintained small. With an MR element using this spacer layer, the MR ratio of approximately 12-13% can be obtained when the RA is 0.3 $\Omega\mu m^2$ or less.

Normally, there is a variation among RAs of MR elements even in one wafer. When the variation is large, the number of MR elements or magnetic heads that can be produced from one wafer is decreased; therefore a drawback remains that a yield rate deteriorates.

It is an object of the present invention to provide an MR element in which a configuration of a spacer layer is improved so that a large MR ratio is realized while an RA variation is suppressed.

SUMMARY OF THE INVENTION

A magneto-resistive effect (MR) element of the present invention includes: first and second magnetic layers in which a relative angle formed by magnetization directions changes according to an external magnetic field; and a spacer layer positioned between the first magnetic layer and the second magnetic layer. The spacer layer includes a main spacer layer composed of gallium oxide as a primary component and containing at least one metal element selected from a group of magnesium, zinc, indium and aluminum.

Compared to the known spacer layer formed of a metal layer such as copper or zinc oxide, etc., the spacer layer including the main spacer layer composed of gallium oxide as main component can realize a large MR ratio. For one example, approximately double MR ratio can be obtained with respect to an MR element of the conventional art in which zinc oxide is used for a main spacer layer. Gallium oxide normally exists in an amorphous state where in a thin film state; however, gallium oxide has advantages in that a wide band gap can be maintained even in the amorphous state and in that no lattice matching (matching of lattice constants of two adjacent materials) between the spacer layer and an adjacent ferromagnetic layer is required.

On the other hand, even when gallium oxide is used for the spacer layer, a problem of an RA variation, i.e., an RA variation of MR elements produced from one wafer exists. It is thought that the RA variation is caused by an internal structure variation of gallium oxide such as, for example, oxygen deficient variation and grain boundary distribution variation. In the present invention, the main spacer layer includes at least one metal element that is selected from a group of magnesium, zinc, indium and aluminum. The inventors of the present invention think that adding such a dissimilar metal element to gallium oxide changes atom arrangement of gallium oxide so that the uniformity of the internal structure of gallium oxide is improved. As a result, the RA variation is suppressed and it becomes possible to increase a yield rate.

The above description, as well as other objects, features, and advantages of the present specification will be evident by the detailed description that follows below with reference to attached drawings illustrating the present specification.

DETAILED DESCRIPTION OF THE INVENTION

A number of embodiments of an MR element according to embodiments of the present invention and a thin film magnetic head including the MR element will be explained utilizing the drawings.

(First Embodiment)

Figure 1:
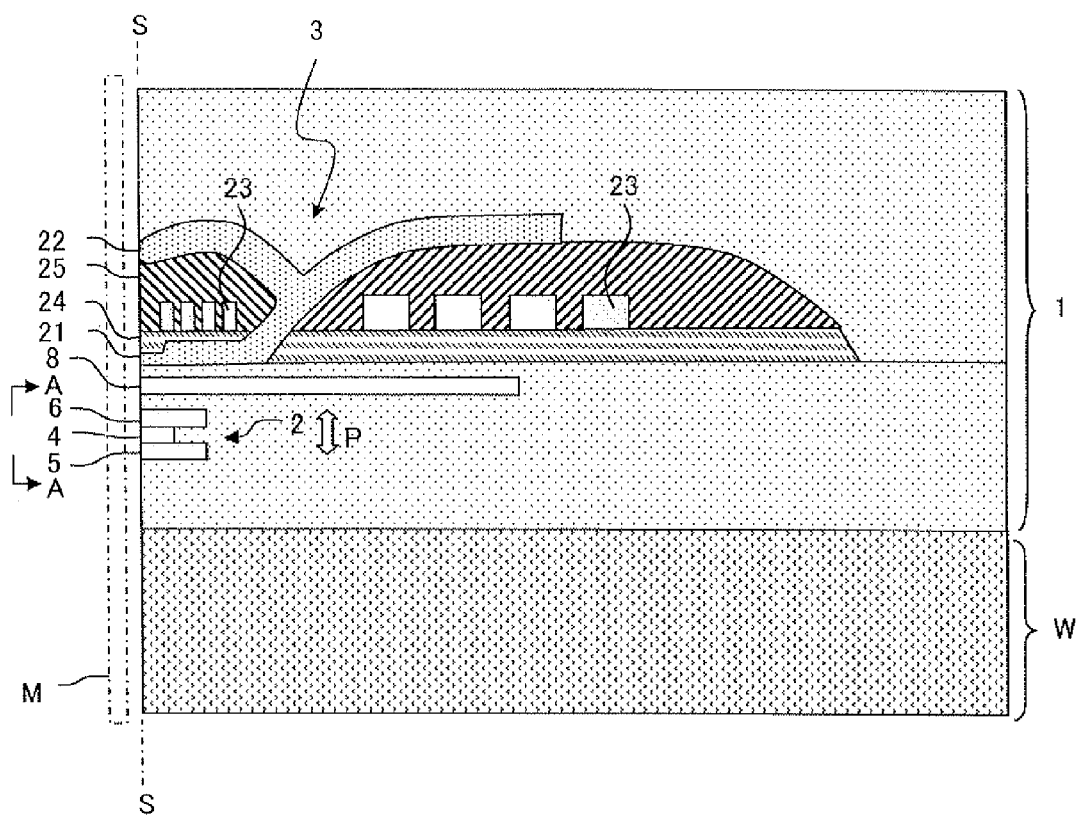
FIG. 1 is a main part cross sectional view of a thin film magnetic head according to a first embodiment.
Figure 2:
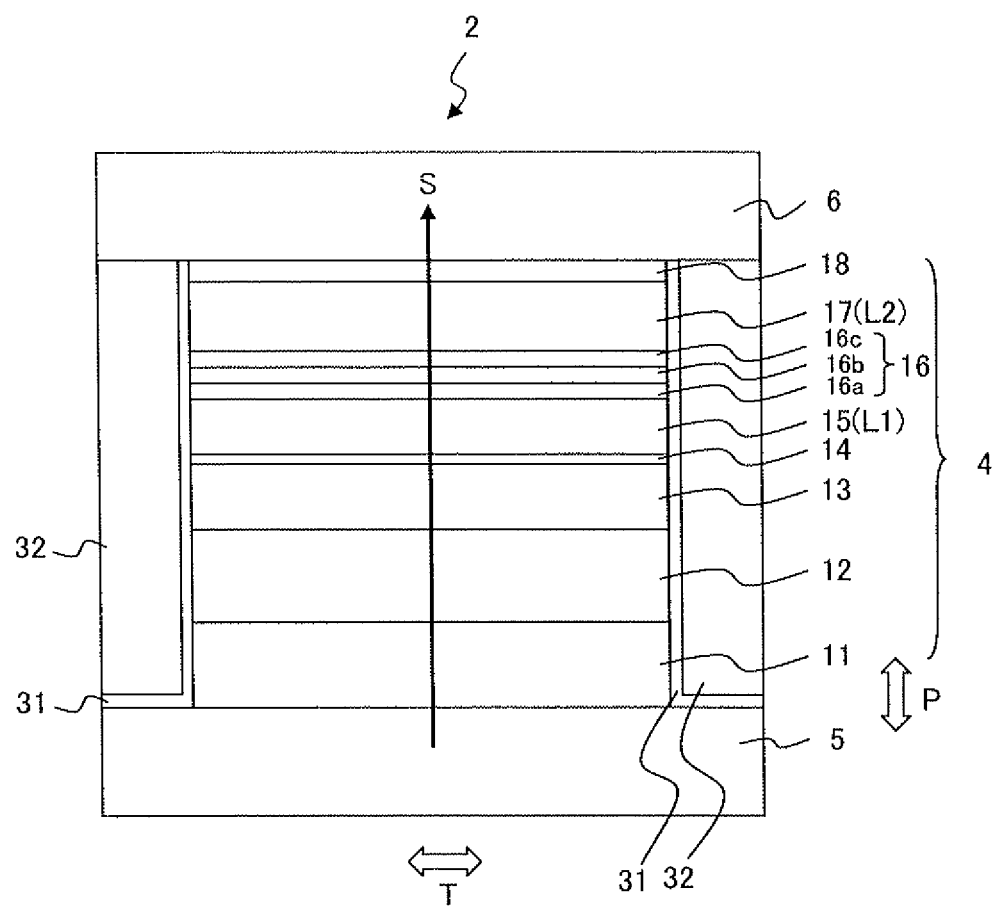
FIG. 2 is a side view of an MR element, as viewed from the A-A direction of FIG. 1, i.e., an air bearing surface.

FIG. 1 illustrates a main part cross sectional view of a thin film magnetic head 1 according to a first embodiment. The thin film magnetic head 1 is formed above a substrate W and includes a reproducing head 2 and a recording head 3. FIG. 2 is a side view of the reproducing head 2, as viewed from the A-A direction of FIG. 1, and illustrates a layer configuration of the reproducing head 2 on an air bearing surface S. The air bearing surface S is a surface of the thin film magnetic head 1 that faces a recording medium M. First, a description will be given regarding a configuration of the reproducing head 2 with reference to FIG. 2.

The reproducing head 2 includes a spin valve type MR element 4, upper and lower shield layers 6 and 5 disposed so as to sandwich the MR element 4 in a film surface orthogonal direction (lamination direction) P, and bias magnetic field application layers 32 disposed on both sides in a track width direction T of the MR element 4 (sheet surface orthogonal direction in FIG. 1). A tip end part of the MR element 4, as illustrated in FIG. 1, is arranged on the air bearing surface S. The MR element 4 is arranged so that a sense current S flows in a film surface orthogonal direction P by voltage applied between the upper shield layer 6 and the lower shield layer 5. A magnetic field from the recording medium M positioned facing the MR element 4 changes by a rotation of the recording medium M. The magnetic field change is detected as an electrical resistance change of a sense current S based on magneto-resistive effect. The MR element 4 reads magnetic information written in the recording medium M utilizing this principle.

Table 1 illustrates one example of a layer configuration of the MR element 4. Table 1 describes from the lower shield layer 5 through the upper shield layer 6 from bottom to up in a lamination order.

TABLE 1

| Layer Configuration | | | Material | Film Thickness (nm) |
|---|---|---|---|---|
| Upper Shield Layer 6 | | | NiFe | 2000 |
| MR Element 4 | Protective layer 18 | | Ru | 10.0 |
| | Magnetization Free Layer 17 (Second Magnetic Layer L2) | | CoFe | 4.0 |
| | Spacer Layer 16 | Second Nonmagnetic Layer 16c | Cu or Zn | 0.7 |
| | | Main Spacer Layer 16b | GaOx + Metal element | 0.9 |
| | | First Nonmagnetic Layer 16a | Cu or Zn | 0.7 |
| | Inner Magnetization Pinned Layer 15 (First Magnetic Layer L1) | | CoFe | 3.5 |
| | Exchange Coupling Transmitting Layer 14 | | Ru | 0.8 |
| | Outer Magnetization Pinned Layer 13 | | CoFe | 3.0 |
| | Anti-Ferromagnetic Layer 12 | | IrMn | 5.0 |
| | Under Layer 11 | | Ru | 2.0 |
| | | | Ta | 1.0 |
| Lower Shield Layer 5 | | | NiFe | 2000 |

The MR element 4 has a layer configuration in which the following are laminated above the lower shield layer 5 formed with an NiFe layer in this order: an under layer 11, an anti-ferromagnetic layer 12, an outer magnetization pinned layer 13, an exchange coupling transmitting layer 14, an inner magnetization pinned layer 15 (first magnetic layer L1), a spacer layer 16, a magnetization free layer 17 (second magnetic layer L2), and a protective layer 18. The protective layer 18 is covered by the upper shield layer 6 formed with a NiFe layer.

The under layer 11 is formed with a lamination film consisting of a Ta layer and a Ru layer and is disposed in order to obtain a favorable exchange coupling between the outer magnetization pinned layer 13 and the anti-ferromagnetic layer 12 laminated on the under layer 11. The under layer 11 can be also configured with a lamination film consisting of a Ta layer and a NiCr layer using NiCr as an alternative for Ru. The outer magnetization pinned layer 13 exchange couples to the anti-ferromagnetic layer 12 composed of IrMn. The outer magnetization pinned layer 13 exchange couples to the inner magnetization pinned layer 15 with the exchange coupling transmitting layer 14 composed of Ru therebetween. As a result, the magnetization direction of the inner magnetization pinned layer 15 is firmly pinned. It is desirable that the inner magnetization pinned layer 15 is magnetized in a direction orthogonal to the air bearing surface S within a film plane. Since the magnetization directions of the inner magnetization pinned layer 15 and the outer magnetization pinned layer 13 are mutually pinned in anti-parallel orientations, overall magnetization of these combined area is suppressed. The magnetization free layer 17 in which a magnetization direction changes according to an external magnetic field is disposed above the inner magnetization pinned layer 15 in a manner of sandwiching the spacer layer 16. The protective layer 18 is disposed to prevent each of the laminated layers from deteriorating. The outer and inner magnetization pinned layers 13 and 15 as well as the magnetization free layer 17 are typically composed of CoFe, but may contain Ni.

The bias magnetic field application layers 32 are disposed on both sides in the track width direction T of the MR element 4 with an insulating layer 31 therebetween. The bias magnetic field application layers 32 are a magnetic domain controlling film for making the magnetization free layer 17 a single magnetic domain, and applies a bias magnetic field to the magnetization free layer 17 in the track width direction T. The insulating film 31 is formed of $Al_2O_3$, and the bias magnetic field application layers 32 are formed of CoPt, CoCrPt or the like.

A sense current S flows in the MR element 4 in the film surface orthogonal direction P. The sense current S is supplied from the upper and lower shield layers 6 and 5 which also function as electrodes. The magnetization direction of the magnetization free layer 17 is controlled in the track width direction T, i.e., in the orientation orthogonal to the magnetization direction of the inner magnetization pinned layer 15, by the bias magnetic field from the bias magnetic field application layers 32 when no external magnetic field is applied. When an external magnetic field from the recording medium M is applied to the magnetization free layer 17, the magnetization direction of the magnetization free layer 17 rotates by a predefined angle in the predefined direction within the film plane according to the orientation and strength of the external magnetic field. The magnetization direction of the magnetization free layer 17 forms a relative angle with the magnetization direction of the inner magnetization pinned layer 15 according to the orientation and strength of the external magnetic field, and a spin dependent scattering of conductive electrons changes according to the relative angle, thereby a magneto-resistive change is generated. The MR element 4 detects this magneto-resistive change and reads magnetic information of the recording medium M.

The position of the magnetization free layer 17 and the outer and inner magnetization pinned layers 13 and 15 may be vertically reversed with respect to the spacer layer 16. That is to say, the magnetization free layer 17 may be positioned closer to the substrate W than the outer and inner magnetization pinned layers 13 and 15. Specifically, the layers from the inner magnetization pinned layer 15 to the anti-ferromagnetic layer 12 are arranged between the protective layer 18 and the spacer layer 16 (arranged such that the inner magnetization pinned layer 15 is at the bottommost side and the anti-ferromagnetic layer 12 is at the top-most side), and the magnetization free layer 17 is arranged between the under layer 11 and the spacer layer 16.

In the present specification, in terms of the magnetization free layer 17 and the inner magnetization pinned layer 15, the layer positioned closer to the substrate W above which the MR element 4 is formed, i.e., beneath the spacer layer 16 as viewed in the lamination direction, is referred to as the first magnetic layer L1, and the layer positioned farther from the first magnetic layer L1 as viewed from the substrate W, i.e., above the spacer layer 16 as viewed in the lamination direction, is referred to as the second magnetic layer L2. In the layer configuration illustrated in Table 1, the inner magnetization pinned layer 15 is the first magnetic layer L1, and the magnetization free layer 17 is the second magnetic layer L2, and in the layer configuration with the reversed positional relation, the magnetization free layer 17 is the first magnetic layer L1, and the inner magnetization pinned layer 15 is the second magnetic layer L2.

The spacer layer 16 includes a main spacer layer 16b composed of gallium oxide as a primary component. A film thickness of the main spacer layer 16b of the example of Table 1 is 0.9 nm; however, the film thickness can be set, for example, in a range of 0.5 nm to 1.2 nm. The main spacer layer 16b further includes at least one metal element that is selected from a group of magnesium, zinc, indium and aluminum. These metal elements may exist in a coupled state with oxygen (oxidation state), and also may exist in a non-coupled state with oxygen.

The main spacer layer 16b may contain additives other than the above-mentioned metal elements. The additives are, for example, other metals and metal oxides. Also, the mole fraction of gallium oxide in the main spacer layer 16b is preferably 50% or more. The composition of gallium oxide is expressed by the general formula GaOx where the range of x is $1.45 \leq x \leq 1.55$. The main spacer layer 16b is normally formed in an amorphous state. GaOx has a larger resistance value and also a larger resistance change compared to Cu used in a conventional spacer layer. Therefore, a larger MR ratio may be obtained compared to the conventional MR element in which Cu is used as the spacer layer.

The main spacer layer may contain only one metal element out of the metal elements selected from the above-mentioned group. In this case, it is desirable that a ratio of "a content of the one metal element" to "a total content of gallium and the one metal element in the main spacer layer 16b" is from 1% atomic percent to 30% atomic percent. For example, when the main spacer layer 16b contains only Mg out of the above-mentioned metal elements, it is good enough that the ratio of an Mg content (atomic percent) to a total content (total atomic percent) of Ga and Mg in the main spacer layer is from 1% to 30%.

The main spacer layer 16b may contain two or more metal elements out of the metal elements selected from the above-mentioned group. In this case, it is desirable that a ratio of "a total content of the two or more metal elements" to "a total content of gallium and the two or more metal elements in the main spacer layer 16b" is from 1% atomic percent to 30% atomic percent. For example, when the main spacer layer 16b contains only Mg and Zn out of the above-mentioned metal elements, it is necessary that the ratio of a total content (total atomic percent) of Mg and Zn to a total content (total atomic percent) of Ga, Mg and Zn in the main spacer layer is from 1% to 30%. In this case, it is unnecessary that a ratio of "a content of each of the metal elements" to "a total content of gallium and the two or more metal elements" is from 1% atomic percent to 30% atomic percent. This is because all magnesium, zinc, indium and aluminum have a common effect of suppressing the variation of RA of gallium oxide. In other words, even when only one type of metal element exists in gallium oxide or even when plural types of metal elements exist, the effect of suppressing the variation of RA of gallium oxide can be equally obtained. Therefore, in order to suppress the variation of RA, the total content of these metal elements are important.

Gallium oxide is a promising material for realizing a high MR ratio. However, since gallium oxide contains oxygen, when the first and second magnetic layers L1 and L2 are adjacent to the main spacer layer 16b, elements contained in the first and second magnetic layers L1 and L2 such as Fe, Co, Ni and the like, and particularly Fe, have a tendency for oxidation. When these elements oxidize, there is a tendency for the MR ratio to fall.

Therefore, for the purpose of avoiding direct contact between the main spacer layer 16b and the first magnetic layer L1 in order to effectively prevent oxidation of the first magnetic layer L1, it is preferable that the spacer layer 16 includes a first nonmagnetic layer 16a composed of copper or at least partially oxidized copper. The first nonmagnetic layer 16a may be composed as well of zinc or at least partially oxidized zinc. Oxidation of copper or zinc may occur due to oxygen diffusion from the main spacer layer 16b. The first nonmagnetic layer 16a is positioned between the main spacer layer 16b and the first magnetic layer L1 in contact with both.

For the same purpose, the spacer layer 16 includes a second nonmagnetic layer 16c that is composed of zinc or at least partially oxidized zinc and is positioned between the main spacer layer 16b and the second magnetic layer L2 in contact with both. The second nonmagnetic layer 16c may be composed as well of copper or at least partially oxidized copper. Oxidation of copper or zinc may occur due to oxygen diffusion from the main spacer layer 16b. From the same principle, the second nonmagnetic layer 16c can prevent oxidation of the second magnetic layer L2.

Referencing FIG. 1 again, the recording head 3 is disposed above the reproducing head 2 with an interelement shield layer 8 formed therebetween by a sputtering method or the like. The recording head 3 has a configuration for so-called perpendicular magnetic recording. A magnetic pole layer for writing is composed of a main magnetic pole layer 21 and an auxiliary magnetic pole layer 22. These magnetic pole layers are formed by a frame plating method or the like. The main magnetic pole layer 21 is formed of FeCo and is arranged on the air bearing surface S in an orientation nearly orthogonal to the air bearing surface S. A coil layer 23 extending over a gap layer 24 composed of an insulating material is wound around the periphery of the main magnetic pole layer 21 so that a magnetic flux is induced to the main magnetic pole layer 21 by the coil layer 23. The coil layer 23 is formed by a frame plating method or the like. The magnetic flux is guided within the main magnetic pole layer 21 and is emitted from the air bearing surface S towards the recording medium M. The main magnetic pole layer 21 is tapered not only in the film surface orthogonal direction P but also in the track width direction T near the air bearing surface S to generate a minute and strong write magnetic field in accordance with the high recording density.

The auxiliary magnetic pole layer 22 is a magnetic layer magnetically coupled with the main magnetic pole layer 21. The auxiliary magnetic pole layer 22 is a magnetic pole layer with a film thickness between approximately 0.01 μm and approximately 0.5 μm and is formed of an alloy composed of two or three of any of Ni, Fe, Co or the like. The auxiliary magnetic pole layer 22 is disposed in a manner that branches from the main magnetic pole layer 21 and faces the main magnetic pole layer 21 with the gap layer 24 and a coil insulating layer 25 therebetween on the air bearing surface S side. The end part of the auxiliary magnetic pole layer 22 on the air bearing surface S side forms the trailing shield part in which the layer cross-section is wider than other parts of the auxiliary magnetic pole layer 22. The magnetic field gradient between the auxiliary magnetic pole layer 22 and the main magnetic pole layer 21 becomes steeper in the vicinity of the air bearing surface S by providing this type of auxiliary magnetic pole layer 22. As a result, the signal output jitter is reduced, and the error rate during reading can be lowered.

(Second Embodiment)

Figure 3:
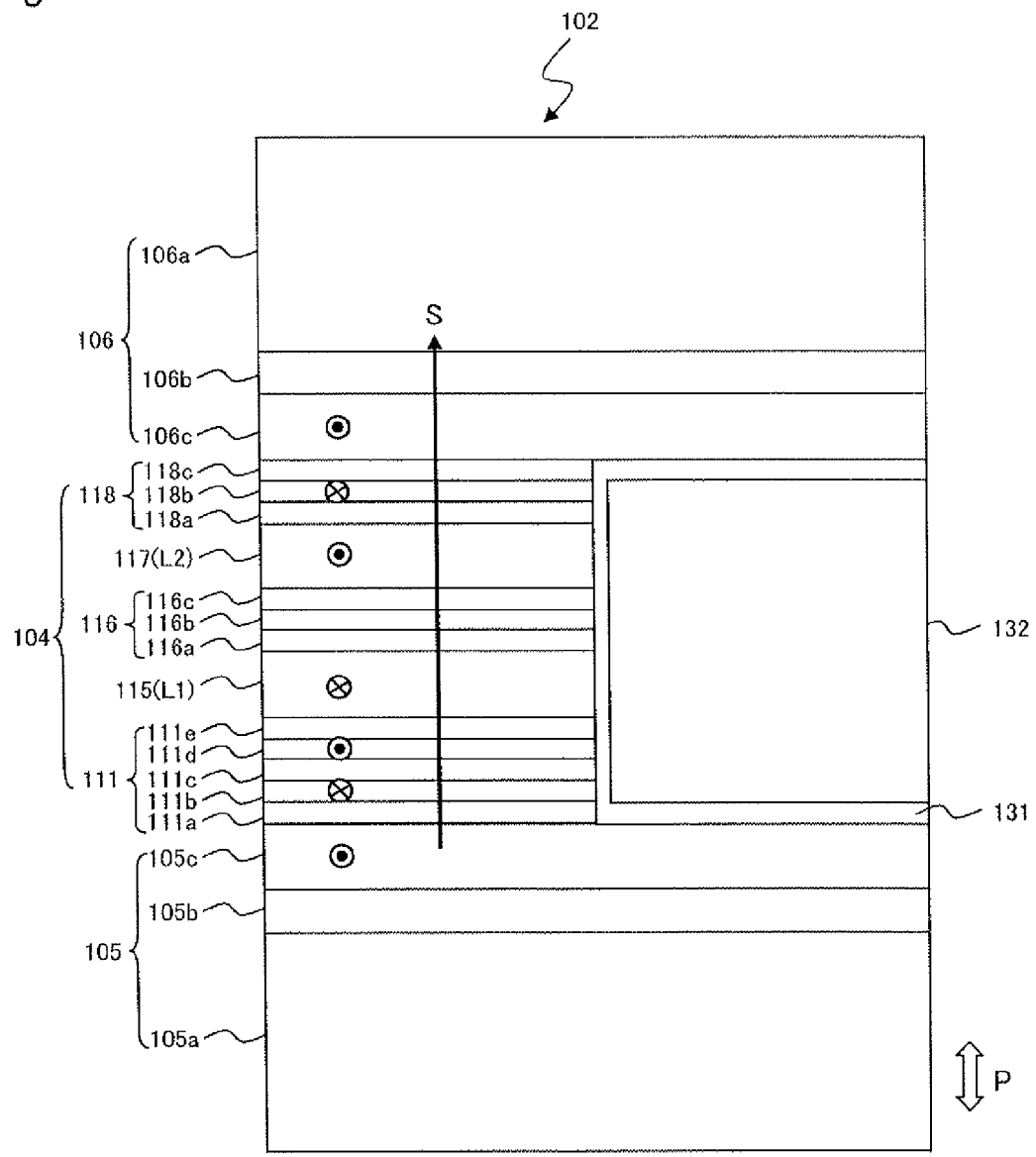
FIG. 3 is a cross sectional view of an MR element according to a second embodiment, as viewed from the same direction as FIG. 1.

A thin film magnetic head 1 of the present embodiment is the same as the first embodiment indicated in FIG. 1 with the exception of the configuration of the reproducing head 2. FIG. 3 and Table 2 illustrate a layer configuration of such an MR element. A reproducing head 102 includes an MR element 104 in which a large number of layers are laminated in the same manner as the first embodiment, and upper and lower shield layers 106 and 105 that are disposed so as to sandwich the MR element 104 in the film surface orthogonal direction P (lamination direction). The upper and lower shield layers 106 and 105 are also used as electrodes for a sense current S to cause the sense current S to flow in the film surface orthogonal direction P of the MR element 104.

With the present embodiment, a first magnetic layer L1 and a second magnetic layer L2 are magnetization free layers 115 and 117 in both of which the magnetization direction changes according to the external magnetic field. A bias magnetic field application layer 132 is disposed on the backside of the MR element 104, as viewed from the air bearing surface S, with an insulating layer 131 therebetween and applies a bias magnetic field to the first and second magnetization free layers 115 and 117 (first and second magnetic layers L1 and L2) in a direction orthogonal to the air bearing surface S. A spacer layer 116 is disposed between the first and second magnetization free layers 115 and 117. A first magnetic linkage layer 111 is disposed between the first magnetization free layer 115 and the lower shield layer 105, and a second magnetic linkage layer 118 is disposed between the second magnetization free layer 117 and the upper shield layer 106.

TABLE 2

| | Film Configuration | | Material | Film Thickness (nm) |
|---|---|---|---|---|
| Upper Shield Layer 106 | Second Main Shield Layer 106a | | NiFe | 2000 |
| | Second Anti-Ferromagnetic Layer 106b | | IrMn | 6.0 |
| | Second Exchange Coupling Magnetic Field Application Layer 106c | | CoFe | 1.5 |
| | | | NiFe | 20.0 |
| MR Element 104 | Second Magnetic Linkage Layer 118 | Exchange Coupling Transmitting Layer 118c | Ru | 0.8 |
| | | Gap Adjustment Layer 118b | CoFe | 6.0 |
| | | Exchange Coupling Transmitting Layer 118a | Ru | 0.8 |
| | Second Magnetization Free Layer 117 (Second Magnetic Layer L2) | | CoF | 4.0 |
| | Spacer Layer 116 | Second Nonmagnetic Layer 116c | Cu or Zn | 0.4 |
| | | Main Spacer Layer 116b | GaOx + Metal element | 0.9 |
| | | First Nonmagnetic Layer 116a | Cu or Zn | 0.6 |
| | First Magnetization Free Layer 115 (First Magnetic Layer L1) | | CoFe | 4.0 |
| | First Magnetic Linkage Layer 111 | Exchange Coupling Transmitting Layer 111e | Ru | 0.8 |
| | | Gap Adjustment Layer 111d | CoFe | 6.0 |
| | | Exchange Coupling | Ru | 0.8 |

TABLE 2-continued

|  | Film Configuration | Material | Film Thickness (nm) |
|---|---|---|---|
|  | Transmitting Layer 111c |  |  |
|  | Gap Adjustment Layer 111b | CoFe | 1.0 |
|  | Exchange Coupling Transmitting Layer 111a | Ru | 0.8 |
| Lower Shield Layer 105 | First Exchange Coupling Magnetic Field Application Layer 105c | NiFe CoFe | 20.0 1.5 |
|  | First Anti-Ferromagnetic Layer 105b | IrMn | 6.0 |
|  | First Main Shield Layer 105a | NiFe | 2000 |

The lower shield layer 105 includes a first main shield layer 105a, and a first anti-ferromagnetic layer 105b and a first exchange coupling magnetic field application layer 105c laminated above the first main shield layer 105a. The magnetization direction of the first exchange coupling magnetic field application layer 105c is pinned in the track width direction T (sheet surface orthogonal direction) due to an anti-ferromagnetic coupling with the first anti-ferromagnetic layer 105b. Similarly, the upper shield layer 106 includes a second main shield layer 106a, and a second anti-ferromagnetic layer 106b and a second exchange coupling magnetic field application layer 106c laminated below the second main shield layer 106a. The magnetization direction of the second exchange coupling magnetic field application layer 106c is pinned in the track width direction T due to an anti-ferromagnetic coupling with the second anti-ferromagnetic layer 106b. The first and second exchange coupling magnetic field application layers 105c and 106c are magnetized mutually in the same direction. In other embodiments, instead of disposing the first and second anti-ferromagnetic layers 105b and 106b and the first and second exchange coupling magnetic field application layers 105c and 106c, the magnetization directions of the first and second main shield layers 105a and 106a may be oriented in the same direction by being formed in a long and narrow shape in the track width direction T and forming a single magnetic domain using a shape anisotropic effect.

The first magnetic linkage layer 111 has a structure in which gap adjustment layers 111b and 111d composed of CoFe are alternated and respectively laminated with exchange coupling transmitting layers 111a, 111c and 111e composed of Ru, and the exchange coupling transmitting layers 111a and 111e are positioned at both side end surfaces. The second magnetic linkage layer 118, in the same manner as the first magnetic linkage layer 111, also has a structure in which a gap adjustment layer 118b composed of CoFe is alternated and laminated with exchange coupling transmitting layers 118a and 118c composed of Ru, and the exchange coupling transmitting layers 118a and 118c are positioned at both side end surfaces. A pair of magnetic layers 105c and 111b, a pair of magnetic layers 111b and 111d, and a pair of magnetic layers 111d and 115 that respectively sandwich the exchange coupling transmitting layers 111a, 111c, and 111e perform exchange coupling. A pair of magnetic layers 106c and 118b and a pair of magnetic layers 118b and 117 that respectively sandwich the exchange coupling transmitting layers 118a and 118c perform exchange coupling. As illustrated in FIG. 3, the magnetization directions alternately reverse (no bias magnetic field is applied).

The total film thickness of the MR element 104 can be adjusted to match the shield gap by adjusting the film thickness of the gap adjustment layers 111b, 111d and 118b. The smaller the shield gap is, the more beneficial it is to realize high recording density; however, the shield gap may also be determined according to the required film thickness of the bias magnetic field application layer 132. In this case, it is preferred to adjust the total film thickness, i.e., the shield gap, of the MR element 104 by changing the film thickness of the gap adjustment layers 111b, 111d and 118b.

Figure 4:
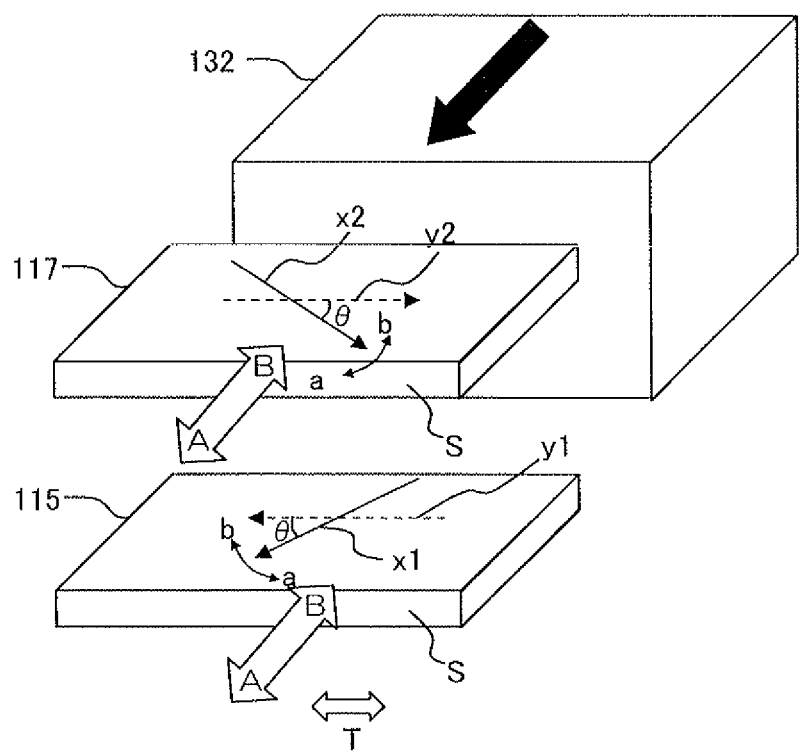
FIG. 4 is a schematic view illustrating a principle of performance of a thin film magnetic head according to the second embodiment.

The above-described MR element 104 performs as will be described hereinafter. A virtual condition will be considered first in which there is no bias magnetic field application layer 132. FIG. 4 is a schematic view illustrating the magnetizations of the first and second magnetization free layers 115 and 117. The magnetization directions of the first and second exchange coupling magnetic field application layers 105c and 106c are transmitted to the first and second magnetization free layers 115 and 117 while reversed at the gap adjustment layers 111b, 111d and 118b with the exchange coupling transmitting layers 111a, 111c, 111e, 118a and 118c therebetween. Therefore, the first magnetization free layer 115 is magnetized in the track width direction T toward an orientation y1 that is anti-parallel to the magnetization direction of the first exchange coupling magnetic field application layer 105c. The second magnetization free layer 117 is magnetized in the track width direction T toward an orientation y2 that is the same as the magnetization direction of the second exchange coupling magnetic field application layer 106c.

Next, a condition will be considered in which a bias magnetic field is applied. The bias magnetic field rotates the magnetization directions of the first and second magnetization free layers 115 and 117 oriented in the track width direction T toward a direction orthogonal to the air bearing surface S. As illustrated by solid line arrows x1 and x2 of FIG. 4, the magnetization directions rotate by the prescribed angle θ in mutually opposite directions from the broken line arrows y1 and y2, and ideally are mutually orthogonal. This is the magnetization state of the first and second magnetization free layers 115 and 117 when no external magnetic field is applied.

When an external magnetic field is applied in this state as illustrated by the outline arrows in the drawing, the magnetization directions of the first and second magnetization free layers 115 and 117 rotate in mutually opposite directions according to the orientation of the external magnetic field. When the external magnetic field is applied in the direction A in the drawing, the magnetization directions (the solid line arrows x1 and x2) of the first and second magnetization free layers 115 and 117 rotate in the direction (a) in the drawing, and when the external magnetic field is applied in the direction B in the drawing, the magnetization directions of the first and second magnetization free layers 115 and 117 rotate in the direction (b) in the drawing. In this manner, a relative angle formed by the magnetization directions of the first and second magnetization free layers 115 and 117 changes according to the external magnetic field, and the resistance value of the sense current S varies based on the magnetoresistive effect. Utilizing this principle, the MR element 104 can detect the orientation and strength of the external magnetic field.

As described above, the MR element 104 of the present embodiment includes: a pair of magnetization free layers 115 and 117 in which the magnetization direction changes according to the external magnetic field; and the spacer layer 116 sandwiched by the magnetization free layers 115 and 117. The MR element 104 differs from the first embodiment with regards to the point that the magnetization directions of the upper shield layer 106 and the lower shield layer 105 are anti-parallel, the magnetization direction of the first magnetization free layer 115 can be reversed by configuring the first magnetic linkage layer 111 with two Ru layers 111a and 111c and a single gap adjustment layer 111b inserted therebetween as illustrated in Table. 3. In the same manner, although not illustrated in the drawing, a similar effect can be obtained by configuring the second magnetic linkage layer 118 as a five layer configuration that is the same as the first magnetic linkage layer 111 in the configuration illustrated in Table 2.

TABLE 3

| | Film Configuration | | Material | Film Thickness (nm) |
|---|---|---|---|---|
| Upper Shield Layer 106 | Second Main Shield Layer 106a | | NiFe | 2000 |
| | Second Anti-Ferromagnetic Layer 106b | | IrMn | 6.0 |
| | Second Exchange Coupling Magnetic Field Application Layer 106c | | CoFe | 1.5 |
| | | | NiFe | 20.0 |
| MR Element 104 | Second Magnetic Linkage Layer 118 | Exchange Coupling Transmitting Layer 118c | Ru | 0.8 |
| | | Gap Adjustment Layer 118b | CoFe | 6.0 |
| | | Exchange Coupling Transmitting Layer 118a | Ru | 0.8 |
| | Second Magnetization Free Layer 117 (Second Magnetic Layer L2) | | CoFe | 4.0 |
| | Spacer Layer 116 | Second Nonmagnetic Layer 116c | Cu or Zn | 0.4 |
| | | Main Spacer Layer 116b | GaOx + Metal element | 0.9 |
| | | First Nonmagnetic Layer 116a | Cu or Zn | 0.6 |
| | First Magnetization Free Layer 115 (First Magnetic Layer L1) | | CoFe | 4.0 |
| | First Magnetic Linkage Layer 111 | Exchange Coupling Transmitting Layer 111c | Ru | 0.8 |
| | | Gap Adjustment Layer 111b | CoFe | 6.0 |
| | | Exchange Coupling Transmitting Layer 111a | Ru | 0.8 |
| Lower Shield Layer 105 | First Exchange Coupling Magnetic Field Application Layer 105c | | NiFe | 20.0 |
| | | | CoFe | 1.5 |
| | First Anti-Ferromagnetic Layer 105b | | IrMn | 6.0 |
| | First Main Shield Layer 105a | | NiFe | 2000 | the pair of magnetization free layers 115 and 117 rotate mutually according to the external magnetic field; however, the same configuration as for the spacer layer 16 in the first embodiment can be applied to the spacer layer 116. In other words, the spacer layer 116 includes a main spacer layer 116b composed of gallium oxide as a primary component. The main spacer layer 116b further includes at least one metal element that is selected from a group of magnesium, zinc, indium and aluminum. The spacer layer 116 includes a first nonmagnetic layer 116a that is composed of copper or at least partially oxidized copper and is positioned between the main spacer layer 116b and the first magnetic layer L1 in contact with both. The first nonmagnetic layer 116a may be composed of zinc or at least partially oxidized zinc. Similarly, the spacer layer 116 includes a second nonmagnetic layer 116c that is composed of zinc or at least partially oxidized zinc and is positioned between the main spacer layer 116b and the second magnetic layer L2 in contact with both. The second nonmagnetic layer 116c may be composed of copper or at least partially oxidized copper.

The magnetization directions of the first and second magnetization free layers 115 and 117 can be reversed by adjusting the total number of Ru layers and gap adjustment layers included in the first and second magnetic linkage layers 111 and 118. For example, when the magnetization directions of

FIRST EXAMPLE

A multilayer film with the layer configuration illustrated in Table 1 was formed above a substrate W composed of $Al_2O_3$—TiC (ALTIC) by using a radio frequency (RF) sputtering device. Mg, Zn, In or Al was used as a metal element to add to a main spacer layer. In the present example, these elements were added as oxides. In the following explanation, oxides of Mg, Zn, In and Al are collectively referred to as MOx. The film thickness of the main spacer layer was 0.9 nm. The main spacer layer was formed by disposing a target composed of $Ga_2O_3$ and a target composed of MOx in a reaction chamber and colliding argon gas simultaneously with these targets. A target composed of $Ga_2O_3$ to which MOx was added may be used. Copper was used for the first nonmagnetic layer 16a and zinc was used for the second nonmagnetic layer 16c. After the film formation, heat treatment was performed at 250° C. for three hours. A plane size (junction size) of the MR element was 0.2 μm×0.2 μm.

Figure 5:
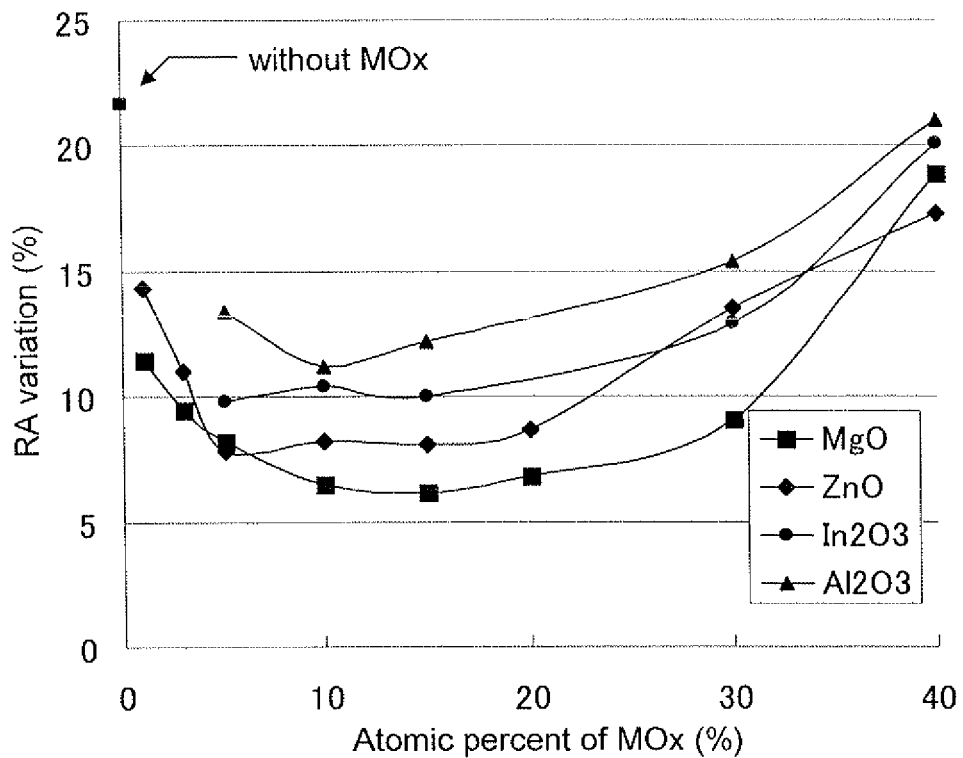
FIG. 5 is a graph illustrating the relationship between the oxide metal additive amount and the RA variation of a first example.

In the above-described MR element, the MR ratio and the average value and variation of RA were obtained by changing the atomic percent of Mg, Zn, In and Al. The atomic percent of Mg, Zn, In and Al were specified as a ratio of a content (atomic percent) of the respective metal element to a total content (total atomic percent) of Ga and these metal elements. In other words, oxygen was excluded from a calculation of the atomic percent. Table 4 and FIG. 5 illustrate the results. The variation of the RA was defined as σ/N(%) when the average value of the RA of respective samples is N and the standard deviation is σ. As a comparative example, an MR element to which no oxide metal was added, i.e., that includes a main spacer layer composed of gallium oxide, was produced in the same process. Similarly, the MR ratio and the average value and variation of the RA were obtained. The MR ratio of respective samples was normalized based on the MR ratio of the comparative example set as 1.

TABLE 4

| | Main Spacer Layer | | | |
|---|---|---|---|---|
| Sample | $Ga_2O_3$ + Mox | Metal Element Atomic Percent (At %) | Normalized MR Ratio | RA Average Value ($\Omega\cdot\mu m^2$) | RA Variation (%) |
| Comparative Example | No MOx added | 0 | 1.00 | 0.19 | 21.7 |
| #1-1 | M = Mg | 1 | 0.98 | 0.19 | 11.5 |
| #1-2 | M = Mg | 3 | 0.97 | 0.21 | 9.5 |
| #1-3 | M = Mg | 5 | 1.05 | 0.21 | 8.2 |
| #1-5 | M = Mg | 10 | 1.06 | 0.18 | 6.5 |
| #1-6 | M = Mg | 15 | 1.02 | 0.20 | 6.2 |
| #1-7 | M = Mg | 20 | 1.02 | 0.25 | 6.8 |
| #1-8 | M = Mg | 30 | 0.95 | 0.31 | 9.1 |
| #1-9 | M = Mg | 40 | 0.63 | 0.29 | 18.9 |
| #2-1 | M = Zn | 1 | 0.95 | 0.20 | 14.3 |
| #2-2 | M = Zn | 3 | 1.05 | 0.23 | 11 |
| #2-3 | M = Zn | 5 | 1.06 | 0.21 | 7.8 |
| #2-5 | M = Zn | 10 | 1.07 | 0.20 | 8.2 |
| #2-6 | M = Zn | 15 | 1.01 | 0.17 | 8.1 |
| #2-7 | M = Zn | 20 | 0.99 | 0.20 | 8.7 |
| #2-8 | M = Zn | 30 | 0.95 | 0.26 | 13.5 |
| #2-9 | M = Zn | 40 | 0.75 | 0.29 | 17.3 |
| #3-1 | M = In | 5 | 0.93 | 0.28 | 9.8 |
| #3-2 | M = In | 10 | 0.98 | 0.28 | 10.4 |
| #3-3 | M = In | 15 | 1.02 | 0.24 | 10 |
| #3-4 | M = In | 30 | 0.89 | 0.28 | 12.9 |
| #3-5 | M = In | 40 | 0.56 | 0.29 | 20.1 |
| #4-1 | M = Al | 5 | 1.02 | 0.22 | 13.4 |
| #4-2 | M = Al | 10 | 0.92 | 0.26 | 11.2 |
| #4-3 | M = Al | 15 | 0.99 | 0.23 | 12.2 |
| #4-4 | M = Al | 30 | 0.90 | 0.28 | 15.4 |
| #4-5 | M = Al | 40 | 0.63 | 0.32 | 21 |

Even though any oxide metal was used, with the content of metal element 1% (atomic percent), the variation of the RA is largely suppressed and the same effect is expected in a range up to at least approximately 30%. On the other hand, with an excess of 30% (atomic percent), the MR ratio tends to decrease. It is considered because, when the content is in the excess of 30%, the added metal elements behave like impurities and spin polarized electrons scatter. Therefore, it is desirable that the upper limit of the content of metal element is 30% (atomic percent) and the lower limit is 1% (atomic percent). The desirable range of the average value of the RA is 0.1-0.3 $\Omega\cdot\mu m^2$ and most of the samples are in this range. Mg and Zn are superior in suppressing the variation of the RA in particular, and Mg is the best out of them. In the case of Mg, the particularly preferable range of the content is 10-20%, and in the case of Zn, the particularly preferable range of the content is 5-20%.

SECOND EXAMPLE

A multilayer film with a layer configuration illustrated in Table 2 was formed above a substrate W composed of $Al_2O_3$—TiC (ALTIC) by using a RF sputtering device. MgO, ZnO, $In_2O_3$ and $Al_2O_3$ were used as oxide metal MOx of a main spacer layer, and the film thickness of the main spacer layer was 0.9 nm. The main spacer layer was formed in the same process as the first example. Copper was used for a first nonmagnetic layer 116a and zinc was used for a second nonmagnetic layer 116c. After the film formation, heat treatment was performed at 250° C. for three hours. A plane size (junction size) of an MR element was 0.2 μm×0.2 μm.

Figure 6:
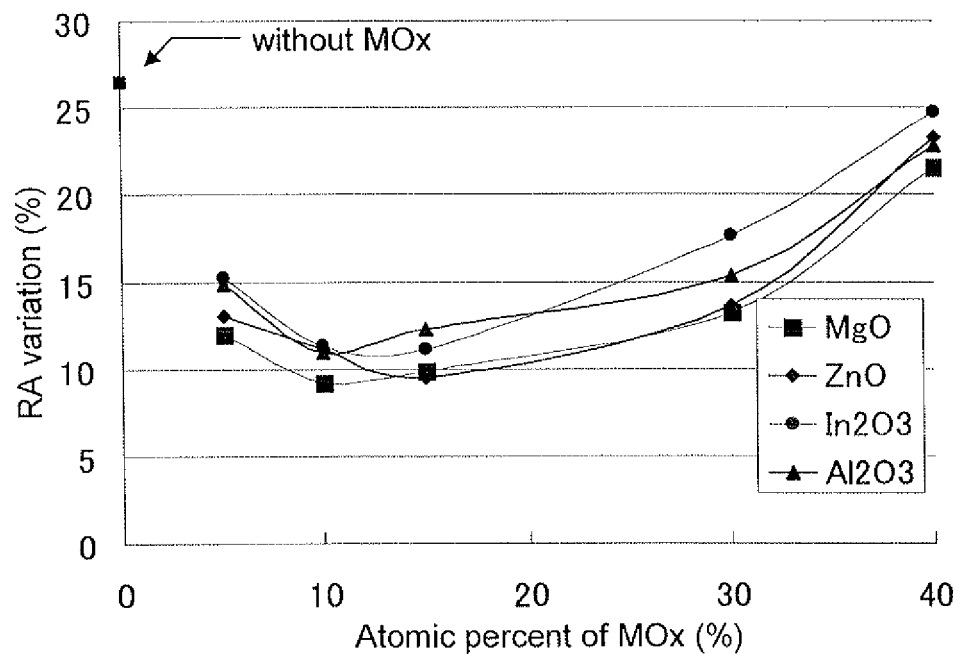
FIG. 6 is a graph illustrating the relationship between the oxide metal additive amount and the RA variation of a second example.

As in the first example, the MR ratio, and the average value and variation of the RA were obtained by changing an atomic percent of Mg, Zn, In and Al. Table 5 and FIG. 6 illustrate the results.

TABLE 5

| | Main Spacer Layer | | | |
|---|---|---|---|---|
| Sample | $Ga_2O_3$ + Mox | Metal Element Atomic Percent (At %) | Normalized MR Ratio | RA Average Value ($\Omega\cdot\mu m^2$) | RA Variation (%) |
| #5-0 | No MOx added | 0 | 1.00 | 0.23 | 26.5 |
| #5-1 | M = Mg | 5 | 0.99 | 0.21 | 12 |
| #5-2 | M = Mg | 10 | 1.08 | 0.21 | 9.2 |
| #5-3 | M = Mg | 15 | 0.96 | 0.20 | 9.9 |
| #5-4 | M = Mg | 30 | 0.77 | 0.25 | 13.2 |
| #5-5 | M = Mg | 40 | 0.58 | 0.30 | 21.6 |
| #6-1 | M = Zn | 5 | 1.01 | 0.22 | 13 |
| #6-2 | M = Zn | 10 | 0.99 | 0.23 | 11.1 |
| #6-3 | M = Zn | 15 | 0.94 | 0.21 | 9.5 |
| #6-4 | M = Zn | 30 | 0.87 | 0.26 | 13.6 |
| #6-5 | M = Zn | 40 | 0.74 | 0.27 | 23.3 |
| #7-1 | M = In | 5 | 0.98 | 0.26 | 15.2 |
| #7-2 | M = In | 10 | 1.00 | 0.25 | 11.3 |
| #7-3 | M = In | 15 | 0.99 | 0.26 | 11.1 |
| #7-4 | M = In | 30 | 0.91 | 0.22 | 17.6 |
| #7-5 | M = In | 40 | 0.81 | 0.27 | 24.7 |
| #8-1 | M = Al | 5 | 1.02 | 0.23 | 14.9 |
| #8-2 | M = Al | 10 | 0.90 | 0.20 | 10.9 |
| #8-3 | M = Al | 15 | 0.96 | 0.23 | 12.3 |
| #8-4 | M = Al | 30 | 0.89 | 0.27 | 15.3 |
| #8-5 | M = Al | 40 | 0.75 | 0.25 | 22.8 |

The basic tendency is the same as the first example. In other words, the variation of the RA is largely reduced only by adding small amount of these metal elements, and the same effect is expected when the content is in a range up to at least approximately 30%. There is a tendency for the MR ratio to be reduced when the content of metal element is in the excess of 30%. Therefore, it is desirable that the upper limit of the content of metal element is 30% as in the first example. Since the relationship between the content of the metal elements and the variation of the RA are extremely similar to the first example, it is considered that sufficient effect is provided with 1% of the content in the present example also. Therefore, it is possible to set the lower limit of the content of the metal element as 1% as in the first example.

Figure 7:
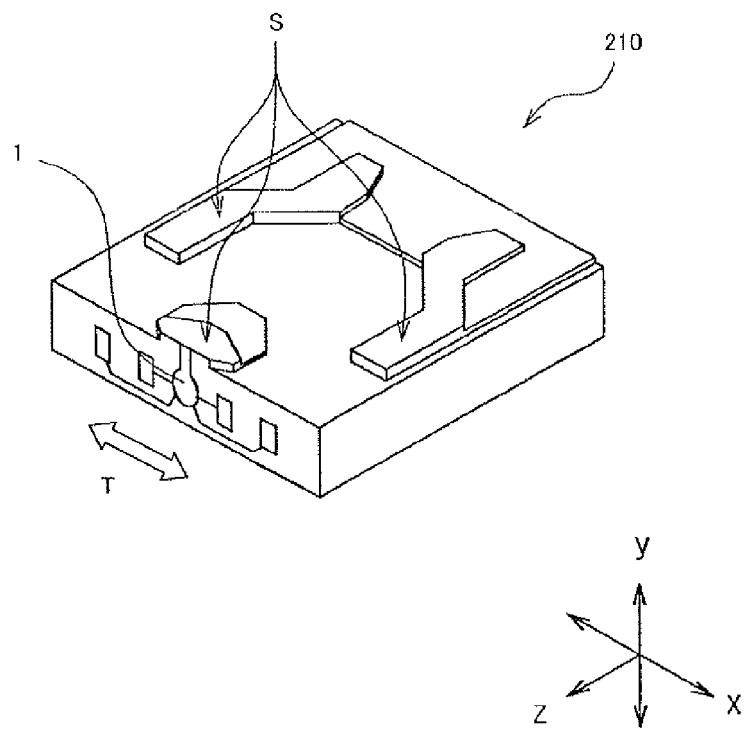
FIG. 7 is a perspective view of a magnetic head slider of the present invention.

Next, the description regarding a magnetic head slider on which the thin film magnetic head 1 is mounted will be given. Referring to FIG. 7, a magnetic head slider 210 has a substantially hexahedral shape, and one surface of the six outer surfaces is the recording air bearing surface S that faces a hard disk. The magnetic head slider 210 is arranged in the hard disk device so as to face the hard disk, which is a disk-shaped recording medium M that is rotatably driven. When the hard disk rotates in the z-direction of FIG. 8, air flow passing between the hard disk and the magnetic head slider 210 generates a downward lifting force in the y-direction to the magnetic head slider 210. The magnetic head slider 210 flies above the surface of the hard disk due to the lifting force. In the vicinity of the edge part of the magnetic head slider 210 (edge part in bottom left of FIG. 8) on the air flow exit side, the thin film magnetic head 1 is formed.

Figure 8:
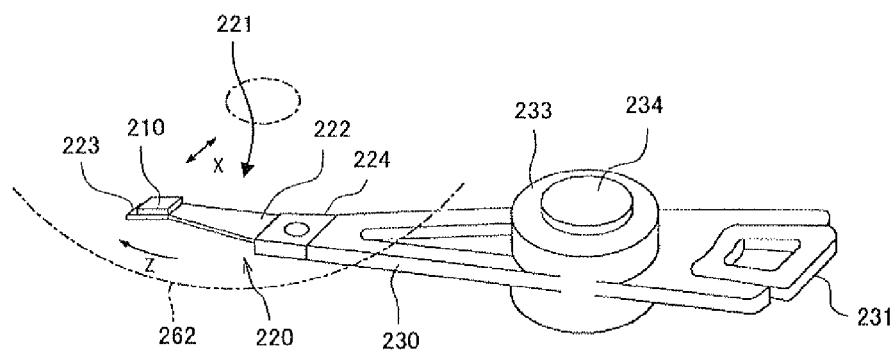
FIG. 8 is a perspective view of a head arm assembly of the present invention.

Referring to FIG. 8, a head gimbal assembly 220 includes the magnetic head slider 210 and a suspension 221 elastically supporting the magnetic head slider 210. The suspension 221 includes a load beam 222, a flexure 223 and a base plate 224. The load beam 222 is formed of stainless steel in a plate spring shape. The flexure 223 is arranged in one edge part of the load beam 222. The base plate 224 is arranged in the other edge part of the load beam 222. The magnetic head slider 210 is joined to the flexure 223 to give the magnetic head slider 210 suitable flexibility. At the part of the flexure 223 to which the magnetic head slider 210 is attached, a gimbal part is disposed to maintain the magnetic head slider 210 in an appropriate orientation.

An assembly in which the head gimbal assembly 220 is mounted to an arm 230 is referred to as a head arm assembly 221. The arm 230 moves the magnetic head slider 210 in a track crossing direction x of a hard disk 262. One edge of the arm 230 is attached to the base plate 224. To the other edge of the arm 230, a coil 231 that forms one part of a voice coil motor is attached. A bearing part 233 is disposed in the middle part of the arm 230. The arm 230 is rotatably supported by a shaft 234 attached to the bearing part 233. The arm 230 and the voice coil motor for driving the arm 230 configure an actuator.

Figure 9:
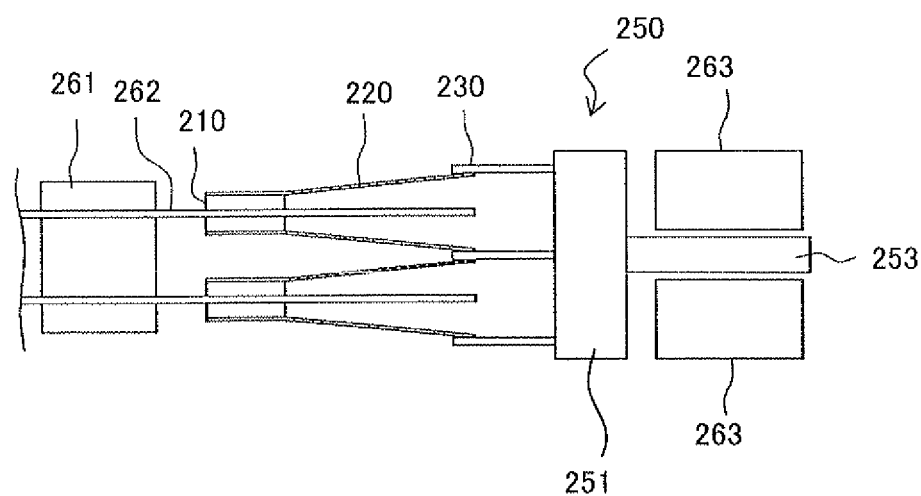
FIG. 9 is a side view of a head stack assembly of the present invention.
Figure 10:
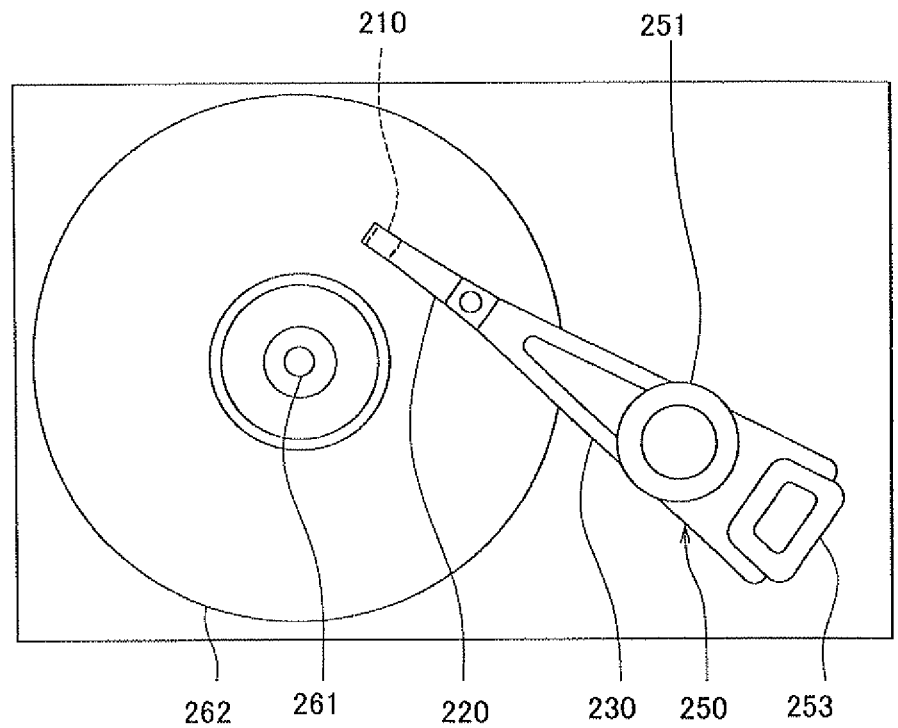
FIG. 10 is a plan view of a hard disk device of the present invention.

Next, referring to FIGS. 9 and 10, the description will be given with regard to a head stack assembly in which the above-described magnetic head slider is integrated, and the hard disk device. The head stack assembly is an assembly in which the head gimbal assembly 220 is attached to each arm of a carriage including a plurality of the arms. FIG. 9 is a side view of the head stack assembly, and FIG. 10 is a plan view of the hard disk device. The head stack assembly 250 includes a carriage 251 including a plurality of arms 230. On each of the arms 230, the head gimbal assembly 220 is attached so that the head gimbal assemblies 220 align mutually at an interval in the vertical direction. On the side of the carriage 251, which is the backside to the arm 230, a coil 253 is mounted to be a part of the voice coil motor. The voice coil motor includes permanent magnets 263 arranged so as to sandwich the coil 253 and to face each other.

Referring to FIG. 10, the head stack assembly 250 is integrated in the hard disk device. The hard disk device includes multiple hard disks 262 attached to a spindle motor 261. For each of the hard disks 262, two magnetic head sliders 210 are arranged in a manner of sandwiching the hard disk 262 and facing each other. The head stack assembly 250 except for the magnetic head slider 210 and the actuator position the magnetic head slider 210 with respect to the hard disk 262 in correspondence with a positioning device as well as supports the magnetic head slider 210. The magnetic head slider 210 is moved in the track crossing direction of the hard disk 262 by the actuator, and is positioned with respect to the hard disk 262. The thin film magnetic head 11 included in the magnetic head slider 210 records information to the hard disk 262 with the recording head 3, and reproduces information recorded on the hard disk 262 with the reproducing heads 2 and 102.

While preferred embodiments of the present invention have been shown and described in detail, and it is to be understood that variety of changes and modifications may be made without departing from the spirit of scope of the following claims or its scope.

What claimed is:

1. A magneto-resistive effect (MR) element, comprising:
   first and second magnetic layers in which a relative angle formed by magnetization directions changes according to an external magnetic field;
   a spacer layer positioned between the first magnetic layer and the second magnetic layer, the spacer layer includes a main spacer layer composed of gallium oxide as a primary component and containing at least one metal element selected from a group of magnesium, zinc, indium and aluminum.
   a first nonmagnetic layer positioned between the main spacer layer and the first magnetic layer and composed of copper or at least partially oxidized copper, or zinc or at least partially oxidized zinc; and
   a second nonmagnetic layer positioned between the main spacer layer and the second magnetic layer and composed of copper or at least partially oxidized copper, or zinc or at least partially oxidized zinc.

2. The magneto-resistive effect (MR) element according to claim 1, wherein
   the main spacer layer includes one of the metal elements selected from the group, and
   a ratio of a content of the one of the metal elements to a total content of gallium and the one of the metal elements in the main spacer layer is from 1% atomic percent to 30% atomic percent.

3. The magneto-resistive effect (MR) according to claim 1, wherein
   the main spacer layer includes two or more of the metal elements selected from the group, and
   a ratio of a total content of the two or more of the metal elements to a total content of gallium and the two or more of the metal elements in the main spacer layer is from 1% atomic percent to 30% atomic percent.

4. The magneto-resistive effect (MR) element according to claim 1, wherein
   either the first magnetic layer or the second magnetic layer is a magnetization free layer in which a magnetization direction changes according to the external magnetic field, and the other is a magnetization pinned layer in which a magnetization direction is pinned according to the external magnetic field, and
   the magnetic head further comprises a pair of bias magnetic field application layers that is disposed on both sides of the MR element in a track width direction and that applies a bias magnetic field in the track width direction to the magnetization free layer.

5. The magneto-resistive effect (MR) element according to claim 1, wherein
   both the first magnetic layer and the second magnetic layer are magnetization free layers in which magnetization directions change according to the external magnetic field, and
   the magnetic head further comprises a bias magnetic field application layer that is disposed on a back surface side of the MR element as viewed from an air bearing surface and that applies a bias magnetic field in a direction orthogonal to the air bearing surface to the first and second magnetic layers.

6. A magnetic head slider in a hexahedral shape comprising:
   an air bearing surface; and
   the MR element according to claim 1 disposed on the air bearing surface.

7. A head gimbal assembly comprising:
   the magnetic head slider according to claim 6; and
   a suspension elastically supporting the magnetic head slider.

8. A hard disk drive device comprising:
a hard disk;
the magnetic head slider according to claim 6; and
a positioning device that positions the magnetic head slider with respect to the hard disk.

* * * * *